G. W. BEERS.
HANDLES FOR CARRIAGE AND OTHER DOORS.

No. 195,694. Patented Oct. 2, 1877.

WITNESSES
Wm. A. Skinkle
Geo. W. Buck

INVENTOR
George W. Beers
By Attorney
Baldwin, Hopkins & Peyton.

UNITED STATES PATENT OFFICE.

GEORGE W. BEERS, OF BRIDGEPORT, CONNECTICUT.

IMPROVEMENT IN HANDLES FOR CARRIAGE AND OTHER DOORS.

Specification forming part of Letters Patent No. 195,694, dated October 2, 1877; application filed June 29, 1877.

*To all whom it may concern:*

Be it known that I, GEORGE W. BEERS, of Bridgeport, in the county of Fairfield and State of Connecticut, have invented certain new and useful Improvements in Handles for Carriage and other Doors, of which the following is a specification:

It is the object of my invention to produce a strong, light, inexpensive, and neat handle, especially applicable to carriage-doors, but which may also be used in connection with other doors, drawers, &c.

My improvements mainly consist in a handle proper or hand-piece composed of a single bent rod or wire inserted and secured in a doubly-perforated hub or socket piece by soldering, riveting, or otherwise, with the rod ends abutting and suitably united.

My improvements further consist in the combination of a shank or spindle adapted to be engaged with a latch or bolt, a hub or socket perforated at right angles with the shank, and a skeleton hand-piece or handle proper formed of a bent rod or wire passing through the hub, rigidly united thereto and having its ends abutted and secured together.

Figure 1:
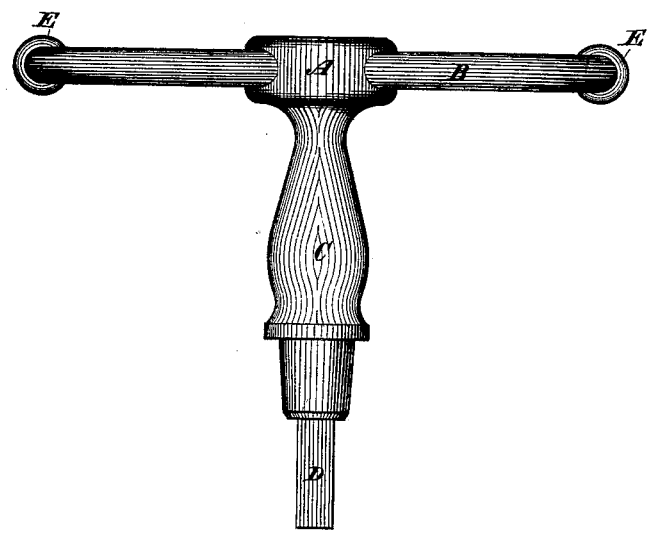
Figure 2:
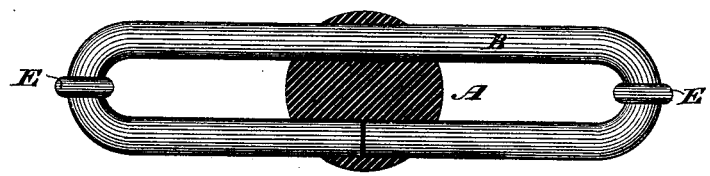

In the accompanying drawings, Figure 1 is an elevation of my improved door-handle; Fig. 2, a section through the hub or handle socket-piece, showing the concealed joint between the abutting ends of the rod forming the handle proper.

A hub or socket piece, A, is provided with two holes or parallel perforations to receive the hand-piece or handle proper, which is formed of a single rod or wire, B, bent to bring its ends together.

The joint formed by the abutting ends of the wire is, by preference, concealed in one of the openings through the hub. The handle is then secured in place and the rod ends held together by soldering, or it may be by riveting, by screws, cross-bars, or in any other well-known way.

The hub is formed with or secured upon a stud or shank, C, having a square or other suitable end, D, to engage with the latch, bolt-work, or catch of the door, as usual.

The handle may be ornamented, as desired, by beads E E, or otherwise.

The manner of forming and securing the handle or hand-piece in the hub is as follows: The rod or wire is first bent at one end, the two ends of the wire then inserted through the holes in the hub, and the other end or longer portion of the wire or rod then bent to bring it in line with and close to or abutting against the end first bent. The joint thus formed in one side of the handle, if to be concealed in the hub, is then shoved or forced into the hub-opening, where it is concealed and the ends prevented from springing or separating laterally. Soldering or other fastening device for preventing endwise movement of the bent ends and to secure the handle firmly to the hub is then applied.

In first bending the rod, when its joint is to be concealed by the hub, care must be taken to turn inward such a portion of its length as to bring the joint formed by abutting the ends midway of the handle so that the joint will lie in the opening through one side of the hub when properly adjusted.

I prefer to use drawn rods or wire, as they are cheap, present a good surface, and the handles can be very handsomely made from a minimum amount of material.

Obviously, square, oval, or other than round wire may be employed.

The joint may be formed outside of the hub-opening and the ends of the rod united by polishing, &c., or by an ornamental band or bead instead of forcing the joint into the hub.

In some cases a hub having a single perforation in which the rod is rigidly secured may be employed, and the joint either be concealed in the hub-opening or outside thereof, as above described.

I claim as of my invention—

1. As an improvement in handles for carriage and other doors, the hereinbefore-described doubly-perforated hub, having a single bent rod or wire passing therethrough, with the joint between its abutting ends united, substantially as set forth.

2. The combination, substantially as hereinbefore set forth, of the shank or spindle, the hub perforated at right angles with the shank, and a skeleton handle or hand-piece, formed of a bent rod or wire passing through the hub, rigidly secured therein and having its ends abutted and united by soldering or otherwise, as set forth.

In testimony whereof I have hereunto subscribed my name.

GEORGE W. BEERS.

Witnesses:
WM. E. DESBROW,
HERMAN BEACH.